May 14, 1968     J. J. CLOSNER     3,383,004
PLASTIC STORAGE TANK

Filed Aug. 17, 1965     2 Sheets-Sheet 1

INVENTOR.
JOHN J. CLOSNER

BY
Curtis Morris+Safford
ATTORNEYS

May 14, 1968 J. J. CLOSNER 3,383,004
PLASTIC STORAGE TANK
Filed Aug. 17, 1965 2 Sheets-Sheet 2

INVENTOR.
JOHN J. CLOSNER
BY
Curtis, Morris & Safford
ATTORNEYS

United States Patent Office 3,383,004
Patented May 14, 1968

3,383,004
PLASTIC STORAGE TANK
John J. Closner, Westbury, N.Y., assignor to The
Preload Company, Inc., Westbury, N.Y.
Filed Aug. 17, 1965, Ser. No. 480,338
2 Claims. (Cl. 220—9)

ABSTRACT OF THE DISCLOSURE

A self-supporting storage tank with a wall formed of inner and outer layers of thermosetting plastic material with an inner core of cellular material characterized by an impermeable metallic barrier contained in one of the thermosetting plastic layers of the wall in order to provide an impervious gas and vapor tight structure.

---

This invention relates to precast reinforced plastic structures and, more particularly, to reinforced plastic storage tanks having structural panel members with integral insulation qualities.

Storage facilities are required for many materials. Tank storage is used not only for liquids, which range from water to corrosive chemicals, but in other cases to granular or powdered materials such as grains and minerals. I have found that tanks, when properly constructed of plastic materials, at least in the wall area, may be used for a wide variety of liquids, semi-solids and solids.

Some materials, such as liquified gases when placed in storage at low or atmospheric pressure must be kept at very low temperatures in order that these materials (which have very low boiling points) may stay in a state of liquification. With the use of standard tank materials, such as steel, there is the problem of providing sufficient and effective insulation materials which will cooperate with the structural steel. The problem is caused at least in part by the different coefficients of thermal expansion and contraction of the structural member, i.e., the steel, and the insulation material.

Another problem with the use of ordinary insulation materials (such as foamed urethane or powdered perlite) in a very low temperature environment is the prevention of moisture from entering into the insulation and, thus, nullifying the protective effect of it.

The control of thermal expansion and contraction is of prime importance in steel storage tanks since the steel contracts much more rapidly due to its very high and efficient degree of thermal conductivity than does insulation material of various types, e.g., concrete, perlite or urethane and such. Special construction techniques as well as specially designed and fabricated structural units are required in building tanks from such materials.

For the storage of liquids, particularly corrosive materials, it is necessary that the tank retain its liquid-tight integrity. I have found that by incorporating an impermeable barrier layer into the wall structure of a reinforced plastic tank, positive means for obtaining liquid-tight integrity is provided. A thin metallic sheet, such as a foil of aluminum, tin or lead, is a suitable barrier layer.

Accordingly, it is an object of the present invention to provide a construction system which provides a liquid-tight tank wall structure and, in particular, permits liquified gas or other products to be stored efficiently and safely at low temperatures.

Another object is to provide a system wherein the wall structure may be fabricated of panels for easy field assembly and erection as a complete unit.

It is another object of the present invention to provide a storage tank structure wherein the barrier layer acts to prevent gas and moisture migration.

It is also a further object of the present invention to provide a structure which is substantially inert and, yet, has sufficient structural strength and rigidity to support large hydrostatic loads.

In this specification and the accompanying drawings, an embodiment of the present invention in the storage of liquified gases is shown. This embodiment is not to be construed as limiting the invention but, rather, it is for the purpose of informing those skilled in the art so that they may practice the invention in many embodiments and within the scope and spirit of the claims which are set forth hereinafter.

In the drawings

Figure 1:
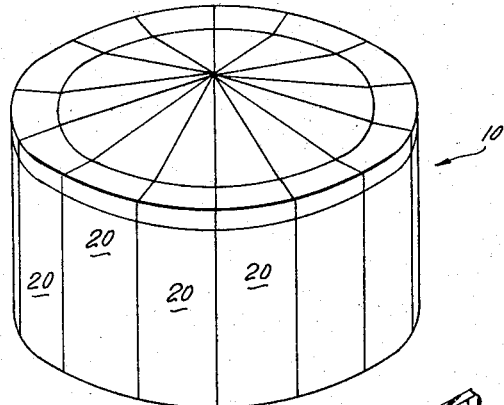
FIGURE 1 is a perspective view of a large storage tank in accordance with the present invention.
Figure 2:
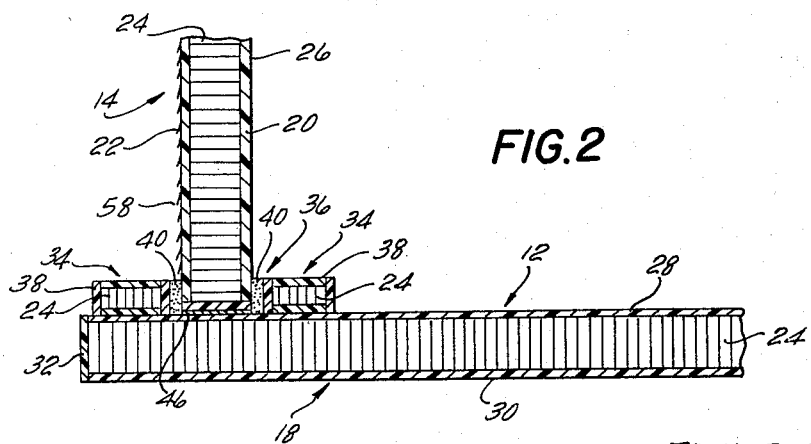
FIGURE 2 is a partially fragmentary and enlarged sectional view of the base detail of the tank of FIGURE 1.

Referring to the drawings and to FIGURE 1 in particular, a tank 10, in accordance with the present invention, is shown. From FIGURE 2 in particular, it will be noted that the tank 10 is comprised of three principal components: a floor 12, a substantially cylindrical wall 14, and a roof 16.

The floor 12, as shown in the illustrated embodiment, is formed with a wall foundation portion 18 in the form of a footing. The foundation 18 extends completely around the periphery of the tank wall 14 to provide suitable support for it. The foundation 18, like much of the rest of the tank, is advantageously made from a series of prefabricated panel portions. The roof 16 is preferably made of prefabricated panel sections, but in some instances it may be desirable to have the roof made of other materials and constructions.

The tank wall 14 is advantageously formed from a plurality of panels 20, the panels having a sandwich type of laminated construction. The panels 20 have an outside surface layer 22, a cellular core 24 and an inside surface layer 26. The surface layers 22 and 26 are preferably made of reinforced thermosetting plastic materials such as cured polyester or epoxy resins reinforced with fiberglass filaments. The cellular core 24 may be made of a foamed insulating material such as a polyester or epoxy resin, or corrugated sheets.

The surface layers 22 and 26 may advantageously be of a minimum thickness since fiberglass reinforced polyesters and epoxides have high tensile strength. However, such thin layers have very little rigidity and cannot stand unsupported. By using the light weight cellular core 24, rigidity is given to the surface layers. In addition, the core 24 has thermal insulating properties which permit the tank structures to be used for applications where good thermal insulation is required.

In some applications of the tank structure, it is necessary that the wall be positively impermeable. Accordingly, it has been found that a thin metallic foil, such as aluminum, may advantageously be positioned in either the inner or outer surface layers to provide an impermeable structure.

Figure 3:
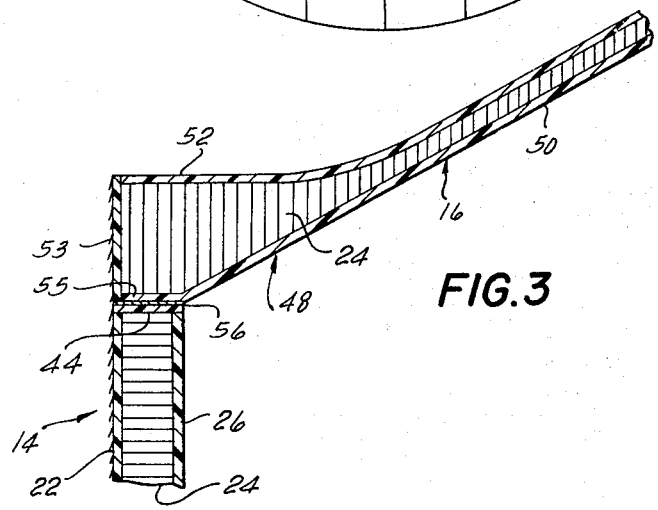
FIGURE 3 is a partially fragmentary and enlarged sectional view of the wall and roof detail of the tank of FIGURE 1.

In the illustrated embodiment, as shown in FIGURE 3 in particular, the wall 14 is set on a foundation 18 which is constructed of the same sandwich type laminate as the wall panels 20. In actual practice the thickness of the foundation 18 may be greater than that of the floor 12. However, in some cases they may have the same thickness. For simplicity in illustration they are shown in the drawings to be of the same overall thickness.

The floor 12 and the foundation 18 have a top surface layer 28 and a bottom surface layer 30. These layers 28 and 30 are also made of a cured polyester or epoxy resin reinforced with fiberglass. A cellular core 24 of foamed polyester or epoxy is placed between the layers to complete the laminate construction. While in the illustrated embodiment the insulation is shown as a foam, in some applications a cellular core of honeycomb or corrugated construction may be used.

The side of the foundation 18 is formed by a side surface layer 32 which is made from a cured polyester or epoxy resin reinforced with fiberglass.

In order to position the wall panels 20, a pair of wall supports 34 are placed about the periphery of the floor 12 in spaced relationship to form an opening 36. The supports 34 have a reinforced outside surface layer 38 also made of polyester or epoxy resin reinforced with fiberglass and the surface layer 38 surrounds a cellular core 24.

The wall panels 20 are placed in the opening 36 and a compatible sealant 40 is used to fill any open space between the supports 34. The sealant may be of any suitable type such as a polysulphide synthetic rubber, epoxy or urethane.

The wall panel 20 has a bottom surface layer 42 and a top layer 44 which are made of a reinforced polyester or epoxy. In order to insure the integrity of the panel 20 once it is set in place, a strong bonding adhesive coating 46 may be used to anchor the panel bottom surface layer 42 to foundation surface layer 28.

The roof system 16 is placed on top of the wall panels 20. The roof may be made of a single unit or of panels as desired. As shown in FIGURE 3, a haunch section 48 is combined with a slab portion 50 to form the roof 16. The roof 16 has a surface layer 52 formed from cured reinforced epoxy or polyester resin and surrounding core material 24.

The haunch portion 48 is provided with a flat surface 54 which is seated on the upper surface 44 of the panel 20. An adhesive bonding coating 56 is used between surface layers 54 and 44 to bond the roof 16 to the wall panels 20.

The wall panels 20 are also joined to each other by a compatible adhesive bonding coating.

After the wall 14 and the roof 16 are in place, a resin impregnated fiberglass tape 58, usually still in the wet or uncured state, is wrapped about the outer wall surface 22 and the surface 53 of the haunch portion 48. Advantageously, the tape 58 is wrapped in overlapping fashion either in a helical or substantially circumferential manner. If the resin is not fully cured, it will cure after being applied to the wall and, by overlapping, a solid integral outside reinforced coating is obtained.

Figure 5:
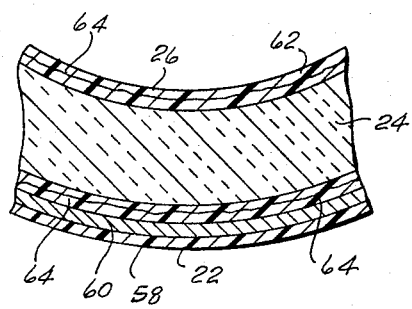
FIGURE 5 is an enlarged fragmentary wall section wherein a metallic foil barrier is positioned adjacent to the outer facing layers of the panel section.
Figure 7:
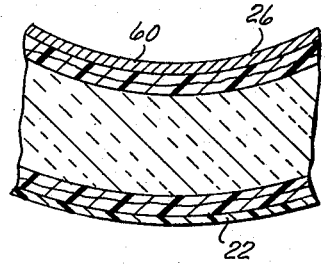
FIGURE 7 is an enlarged fragmentary wall section wherein a metallic foil barrier is positioned adjacent to the inner facing layer of the panel section.
Figure 6:
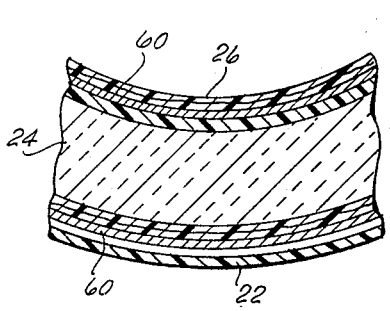
FIGURE 6 is an enlarged fragmentary wall section wherein metallic foil barriers are incorporated into the inner and outer facing layers of the panel section.

As pointed out heretofore, a metallic foil barrier in the wall 14 provides a positive impermeable gas and vapor barrier. In FIGURES 5, 6 and 7 a barrier 60, in the form of aluminum foil, is shown.

In FIGURE 5, the foil barrier 60 is shown positioned between the final tape wrap 58 and the outside surface layer 22.

In FIGURE 6 the foil barrier 60 is internally positioned within both the inside layer 26 and the outside layer 22.

In FIGURE 7 the foil barrier is shown positioned against the inner layer 26. In this construction the foil may advantageously further include a thin polyester film coating (such as Mylar, a trademark of E. I. du Pont, Inc.) which permits the barrier to be adhered to the reinforced surface layer 26 by any well known adhering method.

For clarity sake in FIGURES 5, 6 and 7, the laminate resin is designated as 62 and the reinforcing fiberglass is designated as 64.

Figure 4:
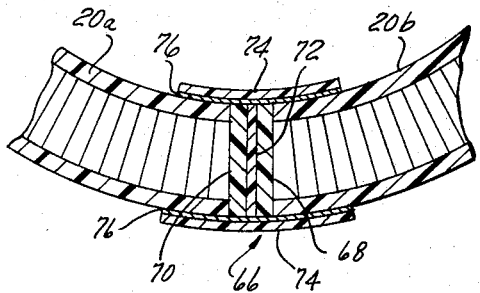
FIGURE 4 is a partially fragmentary and enlarged sectional view of the wall splice detail of the tank of FIGURE 1.

Instead of one high panel 20, it may be desirable to use two shorter panels 20a and 20b which are stacked in abutting relation. As shown in FIGURE 4, the panels 20a and 20b are joined together at an intermediate joint 66. The lower panel 20a has a top reinforced surface layer 68 and the upper panel 20b has a bottom reinforced surface layer 70. An adhesive bonding coating 72 is used to join the panels together.

In order to insure the integrity of the joint 66, a reinforced resin layer 74 is adhesively bonded by a coating 76 to the panels 20a and 20b at the joint 66.

Figure 8:
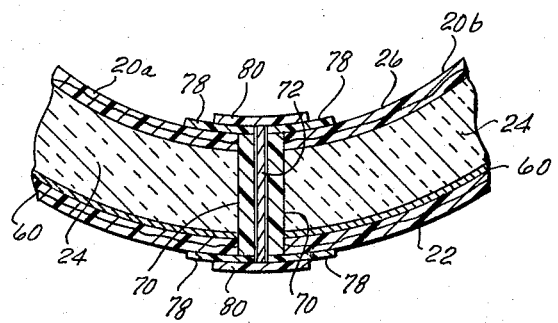
FIGURE 8 is an enlarged partially fragmentary sectional view of a wall joint.

In some structures it may be advantageous to extend the positive impermeable gas and vapor barrier across the joints where the panels abut. As shown in FIGURE 8, panels 20a and 20b may be provided with end cap members 78. The caps 78 are formed of metallic foil with a thin polyester film coating over the metal. Preferably caps 78 are U-shape and are adhered about the ends of the panels 20a and 20b with any suitable adhesive. The adhesive bonding coating 72 joins the panels 20a and 20b together so that the caps are joined together. To complete the sealing of the joint, a splice 80 is affixed to the caps 78. The splice 80 is advantageously a metallic foil coated with a heat sealable film so that by the simple application of heat the splice can be positively joined to the caps 78. The use of metallic foil caps and splices insures that the joints will be positively impermeable.

The resins used in the surface layers of the various elements of the illustrated structure are advantageously thermosetting, substantially scuff and abrasive resistant, of high tensile strength and have good impact strength.

An epoxy resin which is suitable for lamination purposes is epichlorohydrin/bisphenol A-type of low molecular weight (such as Epon Resin 828 sold by the Shell Chemical Company) cured with a modified polyamine curing agent (such as Epon Curing Agent T sold by the Shell Chemical Company).

Polyester resins are well known and as used herein, they are thermosetting resins in which at least one of the reactants contains an unsaturated double bond in an aliphatic group and final cure is obtained by use of a suitable promoter. For hand layup of the surface layers, 1% benzoyl peroxide plus about 0.1% dimethyl anilene are usable catalyst-promoters for room temperature and rapid cure of about .5 to 2 hours.

To those skilled in the art, it will be readily apparent that a great multiple of resins are usable within the scope of the present invention.

As typical of structures which may be built within the scope of this invention, a tank may be cylindrical in shape having a diameter of about 52 feet and a height of about 32 feet. The foundation and bottom floor may be six inches thick including reinforced resin surface layers which are at least about 50–100 mils thick.

The walls also have reinforced resin surface layers at least about 50–100 mils thick with the foamed cellular core about 1–2 inches thick.

The fiberglass reinforcement of the surface layers may be varied as desired. In all cases it will be necessary that the tensile and shear strength of the reinforced resin layers be sufficient to meet the design loads of the structure. In structures of the present type the tensile design stress should be about at least 50,000 p.s.i. and the shear design strength should be at least 350 p.s.i. in order to achieve economical structures. Of course, it is to be understood that the ultimate strength of the materials will usually be two or three times the design strength.

What is claimed:

1. A self-supporting storage tank comprising a floor, a roof, and a substantially cylindrical wall all interconnected to form a complete tank, said wall being comprised of a plurality of prefabricated panel members having longitudinal end portions and the end portion of each panel joined to the adjacent end portion of the next panel as a liquid tight joint, said panels comprised of spaced apart inner and outer layers of reinforced thermosetting plastic material and an inner core of cellular material joined to said layers and filling the space between them, an impermeable metallic barrier contained in one of said layers and coextensive therewith whereby said panels are impervious and gas and vapor tight, and a plurality of convolutions of a resin impregnated fiberglass tape wrapped about the outer surface of the tank wall.

2. A self-supporting storage tank comprising a floor, a roof and a substantially cylindrical wall interconnecting said roof and floor to form a complete tank, said wall being comprised of a plurality of prefabricated panel members having longitudinal end portions and each end portion of each panel imperviously joined to the adjacent end portion of the next panel, said panels consisting of spaced apart inner and outer layers of fiberglass reinforced polyester or epoxy resin laminates and an inner core of cellular thermosetting plastic material intimately joined to said layers and filling the space between them, an impermeable metallic barrier contained in one of said layers and coextensive therewith whereby said panels are impervious and gas and vapor tight, and a plurality of convolutions of a resin impregnated fiberglass tape wrapped about the outer surface of the tank wall.

References Cited

UNITED STATES PATENTS

| | | | |
|---|---|---|---|
| 2,485,647 | 10/1949 | Norquist | 220—9 X |
| 2,863,179 | 12/1958 | Gaugler | 220—9 X |
| 2,896,271 | 7/1959 | Kloote | 220—9 X |
| 2,953,276 | 9/1960 | Dunn | 220—5 |
| 3,298,345 | 1/1967 | Pratt | 220—9 |

THERON E. CONDON, *Primary Examiner.*

GEORGE E. LOWRANCE, *Examiner.*